Nov. 9, 1926.  
T. L. JOHNSON  
1,606,639  
TRANSMISSION MECHANISM  
Filed March 2, 1926
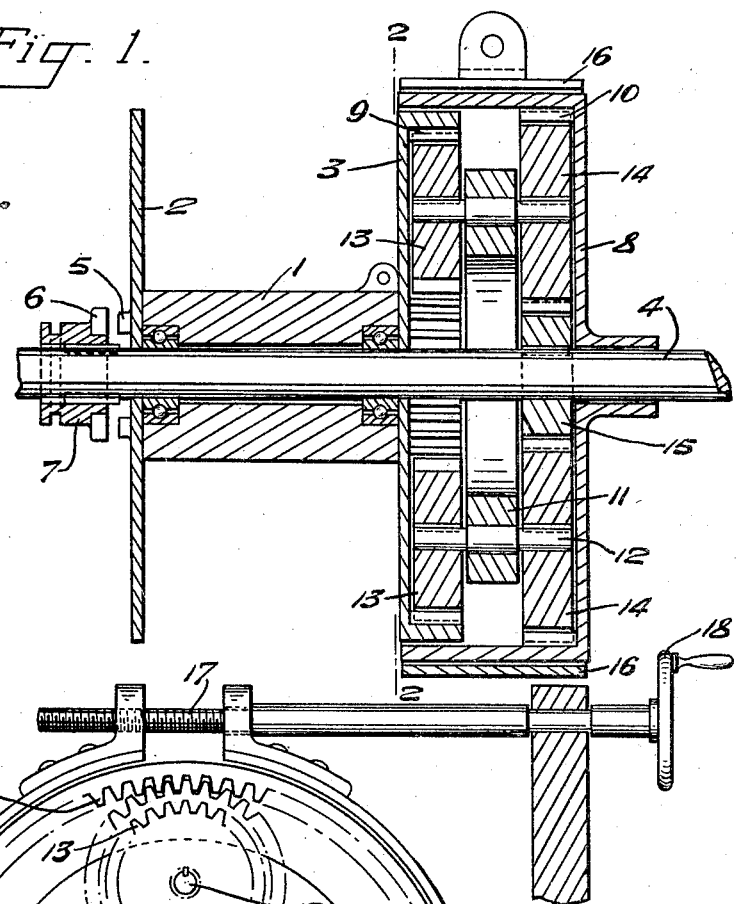
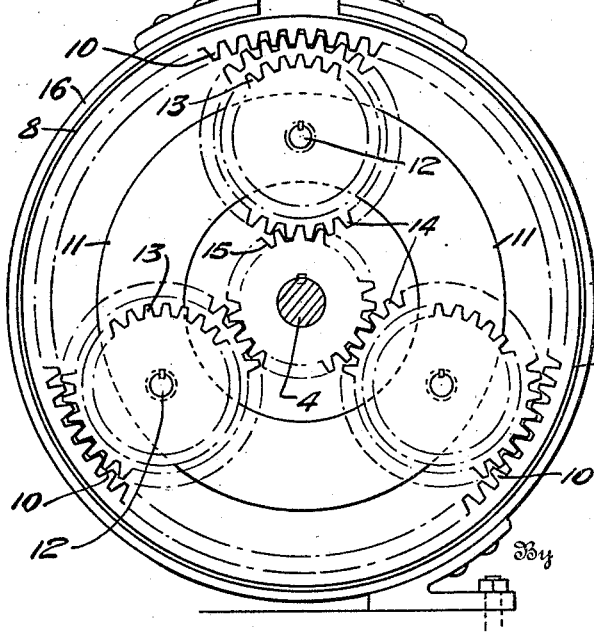
Inventor  
Thomas L. Johnson  
Attorney Patented Nov. 9, 1926.

1,606,639

UNITED STATES PATENT OFFICE.

THOMAS L. JOHNSON, OF CHARLESTON, WEST VIRGINIA.

TRANSMISSION MECHANISM.

Application filed March 2, 1926. Serial No. 91,737.

This invention relates to feed drums or winches, and while it is of general application, it finds its immediate and most practical adaptation to the feeding of coal cutting and loading machinery into the coal, a function which requires the most minute control of winding speed.

One of the objects of the invention is the construction of a drum and associated driving means therefor, including a novel arrangement of differential gearing.

Another object of the invention is the provision of a feed drum, and a drive shaft upon which said drum rotates, with means for selectively connecting said drum either direct to said shaft, or through a system of differential planetary gearing, by means of which a differential low gear ratio is obtained, which is the maximum of an infinite number of speeds ranging down to zero and controlled by a brake on said drum.

Other objects of the invention relate to the details of construction through which simplicity of construction and efficiency and reliability in the operation of the drum are obtained.

In the drawings:

Fig. 1 is a side sectional view.

Fig. 2 is a section taken along the line 2—2 of Fig. 1 with the drum removed.

Referring now in detail to the several figures of the drawings, the numeral 1 represents the barrel of the drum, upon which a cable, not shown, is adapted to be wound, said cable, in the preferred use to which the device is to be put, namely, the feeding of a coal cutting or loading machine, being anchored to a stake in the mine floor, and which by winding of the drum draws the said machine, not shown, upon which the drum and its appurtenant mechanism is mounted.

The heads of the drum are represented at 2 and 3, the latter head being flanged outwardly at its periphery, both to house and constitute certain of the differential gearing presently to be described. A shaft 4, driven by any suitable source of power not shown, for instance, an electric motor, extends through the drum, upon which the latter freely rotates.

The head 2 of the drum is provided with clutch dogs 5, adapted to interdigitate with corresponding dogs 6 carried by a clutch member 7, splinably mounted upon the shaft 4, so that upon occasion the drum can be driven at the same angular speed as the shaft 4. In mining machinery this speed is generally utilized in transporting the machine from one part of the mine chamber to another or in winding in free cable.

A flanged brake drum 8 is freely mounted on the shaft 4, the flange of said brake drum preferably freely overlapping the flange of the feed drum head 3, forming with said feed drum head a housing for the planetary differential gear reduction mechanism. The flanges of both said feed drum head 3 and brake drum 8 are formed with internal gear teeth 9 and 10, respectively, constituting orbits. These orbits are spaced apart a sufficient distance to accommodate the planetary gear ring 11. Said gear ring therefore occupies an intermediate position and carries, at two or more equidistant points, in the present instance three, the planetary gear shafts 12, which are journaled in said ring and project on both sides thereof. Planetary gears 13 and 14 are keyed or otherwise fixed to the opposite ends of said shafts, one set, that is to say, the gears 13, being in mesh with the internal gear 9, and the gears 14 being in mesh with the internal gear 10. The planetary gears of each pair are of different size, the gears 14 in this instance being the larger. A sun-wheel 15 is keyed to the shaft 4 and meshes with the planetary gears 14. A brake band 16 surrounds the brake drum 8 in operative relation thereto, said band being contractible by any suitable means such as the screw 17, preferably remotely operated by means of the hand wheel 18. The brake band 16 may be adjusted to hold the brake drum stationary or to permit any degree of slippage of the same.

In operation, let it be assumed that the brake band is loosed so as to leave the brake drum altogether free. The internal gear 9 will then oppose more resistance to movement than will the internal gear 10 on account of the load imposed upon the drum 1 by the tethered cable. Under these conditions the sun-wheel 15 rotates the planetary gears 14 which in turn rotate the planetary gears 13, the latter traveling around the internal gear 9 and translating their shafts 12 and the ring 11 through a circular orbit. This causes the gears 14 to roll freely around the internal gear 10, the differential motion due to the different peripheral speeds of the gears 13 and 14 and their relation to the circumferential ratio of the internal gears 9 and 10 being imparted to the brake drum 8, which will revolve idly around and with the gears 14, no motion whatsoever being transmitted to the feed drum.

Assuming now that the brake band be closed until the brake drum 8 is held fixed. The gear 14 will under these conditions revolve around the internal gear 10, causing revolution of the shafts 12 and gear ring 11, revolving the gears 13 within the internal gear 9. Since, however, the circumferential speed of the gears 13 and 14 differ, the internal gear 9 and with it the feed drum 1 will be rotated, for each rotation of the planetary gears through a distance equal to the difference between the circumferences of said planetary gears.

It is obvious that the brake band may be adjusted to let the brake drum slip a greater or less degree, thus variably apportioning the differential circumferential movement of the planetary gears between the brake drum and feed drum, controlling the speed of the latter.

The rate of revolution of the feed drum when under the control of the differential gearing is very small, and in coal mining machinery it is utilized to advance the cutting or loading appartus at the relatively slow, variable rate of speed requisite for this purpose.

While I have disclosed in this specification and drawings what I believe to be a simple and practical embodiment of my invention, it is to be understood that the specific details thereof are not to be considered limitative in their effect upon the invention, but that the latter may be expressed in any suitable structure falling within the scope of the appended claim.

What I claim as new is:

Transmission mechanism including a drum, a power shaft therefor upon which said drum is freely journaled, clutch means carried by said shaft and one end of said drum for directly engaging said shaft and drum, the other end of said drum being provided with an outwardly directed peripheral flange, a brake drum also freely mounted on said shaft having a peripheral flange and freely cooperating with said drum flange to form a housing, both of said flanges being formed with internal teeth, constituting orbits, a planetary gear carrier within said housing having shafts journaled therein at equidistant points, projecting from opposite sides thereof, a pair of planetary gears fixed to the projecting ends of each shaft, one gear of each pair being of greater diameter than the other, one set of the corresponding gears of the several pairs being in mesh with one orbit and the other set of corresponding gears being in mesh with the other orbit, a sun-wheel keyed to the shaft and meshing with the set of planetary gears which mesh with the orbit on the brake drum, and a brake band operatively related to said brake drum.

In testimony whereof I have hereunto set my hand.

THOMAS L. JOHNSON.